(12) United States Patent
Teets et al.

(10) Patent No.: US 7,900,812 B2
(45) Date of Patent: Mar. 8, 2011

(54) SECURE PHYSICAL CONNECTIONS FORMED BY A KINETIC SPRAY PROCESS

(75) Inventors: Richard E. Teets, Bloomfield, MI (US); Thomas H. Van Steenkiste, Ray, MI (US); Duane D. Kruger, Fishers, IN (US); Robert C. Beer, Noblesville, IN (US)

(73) Assignee: EnerDel, Inc., Indianapolis, IN (US)

( * ) Notice: Subject to any disclaimer, the term of this patent is extended or adjusted under 35 U.S.C. 154(b) by 1610 days.

(21) Appl. No.: 10/999,581

(22) Filed: Nov. 30, 2004

(65) Prior Publication Data

US 2006/0113359 A1   Jun. 1, 2006

(51) Int. Cl.
   *B23K 31/02*   (2006.01)
(52) U.S. Cl. .......................... 228/261; 427/455; 427/192
(58) Field of Classification Search .................. 228/244, 228/248.1, 254, 260, 261, 262.41; 427/192, 427/191, 455, 202; 164/46; 428/469, 702
   See application file for complete search history.

(56) References Cited

U.S. PATENT DOCUMENTS

| | | | |
|---|---|---|---|
| 1,223,777 A * | 4/1917 | Eby | ................................ 220/612 |
| 3,100,724 A | 8/1963 | Rocheville | |
| 3,993,411 A | 11/1976 | Babcock et al. | |
| 4,263,335 A | 4/1981 | Wagner et al. | |
| 4,606,495 A | 8/1986 | Stewart, Jr. et al. | |
| 4,891,275 A | 1/1990 | Knoll | |
| 4,939,022 A | 7/1990 | Palanisamy | |
| 5,187,021 A | 2/1993 | Vydra et al. | |
| 5,271,965 A | 12/1993 | Browning | |
| 5,273,204 A * | 12/1993 | Dalal et al. | ................. 228/166 |
| 5,302,414 A * | 4/1994 | Alkhimov et al. | ............ 427/192 |
| 5,340,015 A * | 8/1994 | Hira et al. | .................... 228/205 |
| 5,395,679 A | 3/1995 | Myers et al. | |
| 5,424,101 A | 6/1995 | Atkins et al. | |
| 5,464,146 A | 11/1995 | Zalvzec et al. | |
| 5,476,725 A | 12/1995 | Papich et al. | |
| 5,527,627 A | 6/1996 | Lautzenhiser et al. | |
| 5,593,740 A | 1/1997 | Strumbon et al. | |

(Continued)

OTHER PUBLICATIONS

Lima et al. (Microstructural characteristics of cold-sprayed nanostructured WC-Co coatings, thin Films 416 (Jul. 3, 2002) 129-135, Elsevier).*

(Continued)

*Primary Examiner* — Roy King
*Assistant Examiner* — Michael Aboagye
(74) *Attorney, Agent, or Firm* — Ice Miller LLP (57) ABSTRACT

A process for physically bonding two parts to each other is disclosed. In addition, a process for forming electrical connections have a low resistance is disclosed. The process is generally applicable to the joining of two parts each formed from a metal, an alloy, or a combination thereof. The process finds special use in the formation of multi-celled batteries. The process involves placing two parts or electrical conductors in contact with each other and then bonding them to each other using a kinetic spray process and powder particles. In formation of a multi-celled battery the particles are preferably electrically conductive. The process enables for rapid and cost effective formation of a physical connection. In addition, the connection can have an electrical resistance of less than about 0.5 milli Ohms and strength equal or greater than ultrasonic welding. The process has the advantage of being a low temperature process thereby lowering the risk of thermal damage to the parts or cells of a multi-cell battery during formation of the connection.

43 Claims, 5 Drawing Sheets

U.S. PATENT DOCUMENTS

| | | | |
|---|---|---|---|
| 5,795,626 A * | 8/1998 | Gabel et al. | 427/458 |
| 5,854,966 A | 12/1998 | Kampe et al. | |
| 5,875,830 A | 3/1999 | Singer et al. | |
| 5,894,054 A | 4/1999 | Poruchuri et al. | |
| 5,907,761 A | 5/1999 | Tohma et al. | |
| 5,952,056 A | 9/1999 | Jordan et al. | |
| 5,989,310 A | 11/1999 | Chu et al. | |
| 6,033,622 A | 3/2000 | Maruyama | |
| 6,051,045 A | 4/2000 | Narula et al. | |
| 6,051,277 A | 4/2000 | Claussen et al. | |
| 6,074,737 A | 6/2000 | Jordan et al. | |
| 6,129,948 A | 10/2000 | Plummet et al. | |
| 6,139,913 A | 10/2000 | Van Steenkiste et al. | |
| 6,283,386 B1 | 9/2001 | Van Steenkiste et al. | |
| 6,291,012 B1 * | 9/2001 | Miyasaka | 427/191 |
| 6,749,002 B2 * | 6/2004 | Grinberg et al. | 164/46 |
| 6,821,558 B2 * | 11/2004 | Zhao et al. | 427/202 |
| 6,861,101 B1 * | 3/2005 | Kowalsky et al. | 427/455 |
| 6,896,933 B2 * | 5/2005 | Van Steenkiste et al. | 427/422 |
| 6,915,964 B2 * | 7/2005 | Tapphorn et al. | 239/128 |
| 7,143,967 B2 * | 12/2006 | Heinrich et al. | 239/597 |

OTHER PUBLICATIONS

Van Steenkiste et al. "Kinetic spray coatings"; Surface & Coatings Technology III; pp. 62-71 (1999).

Liu et al. "Recent development in the fabrication of metal matrix-particulate composites using powder metallurgy techniques"; Journal of Material Science; 29(8):1999-07 (1994).

Papyrin "The cold gas-dynamic spraying method of a new method for coating deposition promises a new generation of technologies"; Novosibirsk Russia.

McCune et al. "Characterization of copper and steel coatings made by the cold gas-dynamic spray method"; National Thermal Spray Conference.

Alkhimov et al. "A method of 'cold' gas-dynamic deposition"; Sov. Phys. Kokl. 36(12):1047-1049 (1990).

Dykuizen et al. "Impact of high velocity cold spray particles" Journal of Thermal Spray Technology; 8(4):559-564 (1999).

Swartz et al. "Thermal resistance at interfaces"; Appl. Phys. Lett.; 51(26)(28):2201-2202 (1987).

Davis et al. "Thermal conductivity of metal-matrix composites"; J. Appl. Phys.; 77(10):4494-4960 (1995).

Stoner et al. "Measurements of the kapitza conductance between diamond and several metals"; Physical Review Letters; 68(10):1563-1566 (1992).

Stoner et al. "Kapitza conductance and heat flow between solids at temperatures from 50 to 300K"; Physical Review B; 48(22):16374 and 16387 (1993).

Johnson et al. "Diamond/AL metal matrix composites formed by the pressureless metal infiltration process"; J. Mater. Res.; 8(5):1169-1173 (1993).

Rajan et al. "Reinforcement coatings and interfaces in aluminum metal matrix composites"; pp. 3491-3503.

Dykhuizen et al. "Gas dynamic principles of cold spray" Journal of Thermal Spray Technology; Jun. 1998; pp. 205-212.

McCune et al. "An exploration of the cold gas-dynamic spray method for several systems", pp. 1-5.

Ibrahim et al. "Particulate reinforced metal matrix composites—a review"; Journal of Materials Science; 26:1137-1156.

"Primecool Products for High Volume Applications", Lanxide Electronic Components, Inc., 4 pages.

"High Performance Thermal Management, Packaging and Structural Products for the Electronics Industry", Lanxide Electronic Components, Inc., 4 pages.

"Reinforced Aluminum Composite Accepted for Electronic Vehicle Application", Lanxide Electronic Components, Inc., Jun. 5, 1997, 2 pages.

"Property Data and Product Selector for LEC's Primex (55-70%SiC) and Primex Cast (18-40%Sic) Composites", Lanxide Electronic Components, Inc., 6 pages.

"Primecool and Primeflo Products", Lanxide Electronic Components, Inc., 3 pages.

"LEC Reinforced Aluminum Primex Cast Process. Sand Castings*-40% SiC Reinforcement", Lanxide Electronic Components, Inc., 7 pages.

* cited by examiner

SECURE PHYSICAL CONNECTIONS FORMED BY A KINETIC SPRAY PROCESS

TECHNICAL FIELD

The present invention is related to formation of secure physical connections between two parts and, more particularly, to secure physical connections formed by a kinetic spray process.

RELATED APPLICATIONS

None.

BACKGROUND OF THE INVENTION

Secure physical connections are necessary in many industrial applications, particularly secure connections between metallic parts. The metallic parts can be formed from metal, alloy, or a combination thereof. Typically these types of parts are secured to each other by welding, spot welding, fasteners, rivets, solder, brazing or adhesives. All of these procedures suffer from various drawbacks including cost, efficiency and in some cases the need to keep the parts below certain temperatures. Often these procedures result in heating of the parts, which can be a disadvantage in many applications. In addition, many of these connection methods are time consuming.

Making secure physical electrical connections in structures such as multi-cell batteries is important. These connections are used to connect the cells of multi-cell batteries in series or parallel depending on the needs of the electrical environment in which they are to be used. One type of battery where such connections are of particular importance is a lithium ion multi-cell battery. In the past the terminals of the individual cells of the battery have been secured to one of two bus bars either in a series connection or a parallel connection. Established methods for connecting the terminals to the bus bars include ultrasonic welding, laser welding, capacitive discharge spot welding, soldering, or mechanical means such as crimping. What ever method is chosen it needs to meet several criteria including: the ability to bond dissimilar metals; electrical resistance of the connection that is below about 0.2 mΩ; low cost per connection; the ability to withstand mechanical, thermal; and impact cycling; resistance to corrosion; and the ability to keep the temperature of the cell near the connection below about 100° C. during formation of the connection to prevent thermal damage to the cell. All of the above methods are able to achieve these criteria to some extent; however, none are an ideal solution.

It would be desirable to develop a cost effective method for securing metal parts to each other. Preferably the method will be fast and efficient. In addition, it would be beneficial to develop a method that is able to join a wide variety of metals, alloys, and combinations thereof. It would also be beneficial to create such a method that does not cause large temperature increases in the parts being joined.

It is also desirable to develop a cost-effective, rapid, and reliable method for formation of electrical connections between a multiple of electrical conductors that can readily be adapted to the environment of a multi-cell battery. Preferably, the method will be capable of meeting the criteria set forth above and be relatively easy to implement.

SUMMARY OF THE INVENTION

In one embodiment, the present invention is a method of physically bonding two pieces to each other comprising the steps of: providing a first part in contact with a second part, each of the first and the second parts formed from a metal, an alloy, or a mixture of a metal and an alloy; providing particles of a powder, the particles formed from a metal, an alloy, or a mixture thereof; entraining the particles in a flow of a heated main gas and heating the particles to a temperature below their melting temperature; and directing the entrained particles through a converging diverging supersonic nozzle, accelerating the particles to a velocity sufficient to result in adherence of the particles on the first and the second parts positioned opposite the nozzle, thereby physically bonding the first and the second parts to each other.

In another embodiment, the present invention is a method of forming a low resistance electrical connection comprising the steps of: providing a first electrical conductor and a second electrical conductor in contact with each other; providing particles of a powder formed from an electrically conductive material; entraining the particles in a flow of a heated main gas and heating the particles to a temperature below their melting temperature; and directing the entrained particles through a converging diverging supersonic nozzle, accelerating the particles to a velocity sufficient to result in adherence of the particles on the first and the second electrical conductors positioned opposite the nozzle, thereby bonding the first and the second electrical conductors to each other and establishing an electrical connection between them with the electrical connection having a resistance of less than or equal to 0.5 milli-Ohms.

In another embodiment, the present invention is a method of forming a low resistance electrical connection in a multi-cell battery comprising the steps of: providing a plurality of battery cells spaced apart from each other and each having at least a first terminal; providing an electrically conductive bus bar having at least one opening therein and positioning the bus bar and the at least one opening in contact with the first terminals; providing particles of a powder formed from an electrically conductive material; entraining the particles in a flow of a heated main gas and heating the particles to a temperature below their melting temperature; and directing the entrained particles through a converging diverging supersonic nozzle at the at least one opening, accelerating the particles to a velocity sufficient to result in adherence of the particles on the first terminals and the sides of the at least one opening positioned opposite the nozzle, thereby bonding the first terminals and the bus bar to each other and establishing an electrical connection between them with the electrical connection having a resistance of less than or equal to 0.5 milli-Ohms.

DESCRIPTION OF A PREFERRED EMBODIMENT

Figure 1:
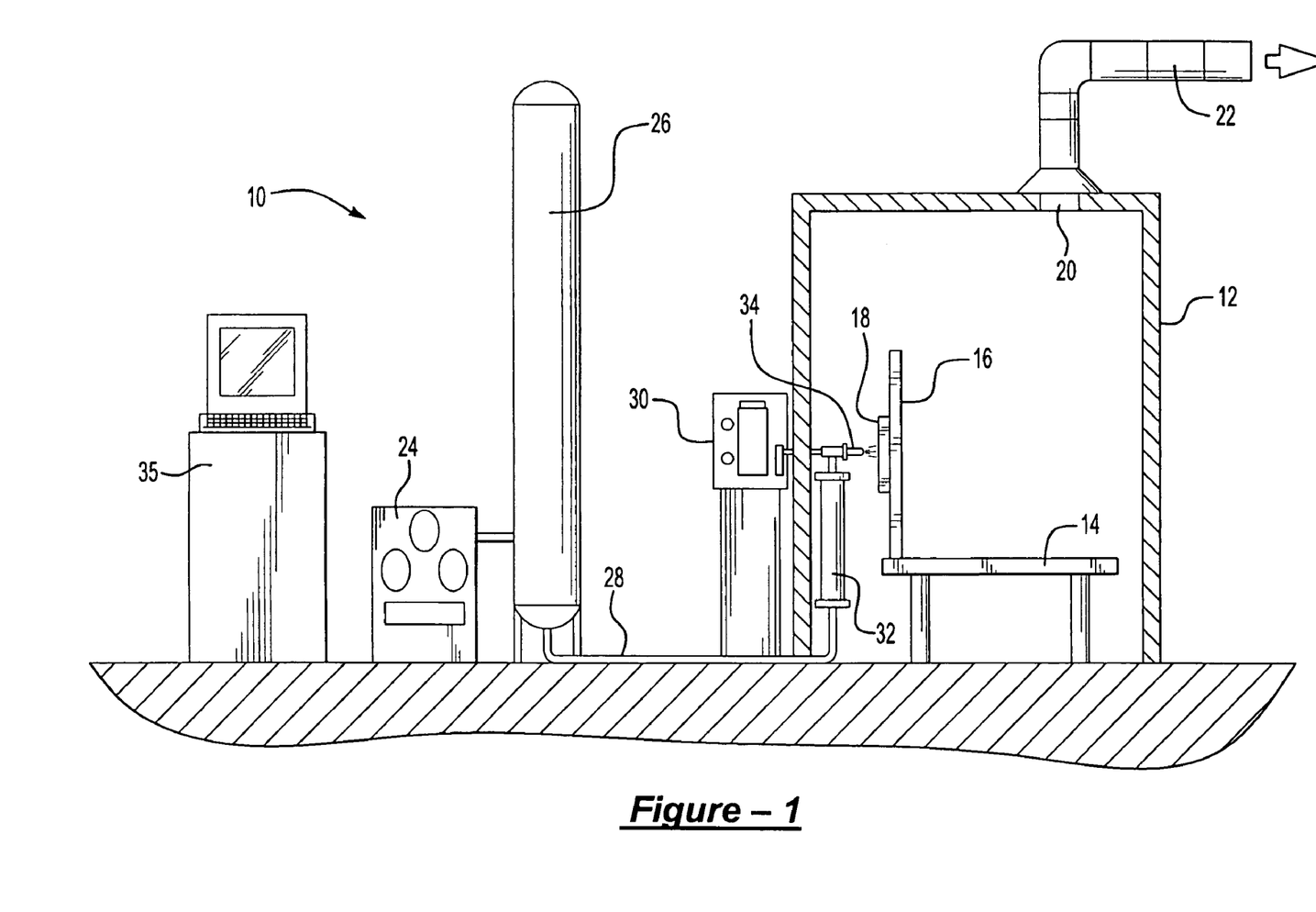
FIG. 1 is a schematic layout illustrating a kinetic spray system for use in the method of the present invention.

Referring first to FIG. 1, a kinetic spray system for use of a supersonic nozzle designed according to the method of the present invention is generally shown at 10. System 10 includes an enclosure 12 in which a support table 14 or other support means is located. A mounting panel 16 fixed to the table 14 supports a work holder 18 capable of movement in three dimensions and able to support at least two parts to be joined according to the present invention. The enclosure 12 includes surrounding walls having at least one air inlet, not shown, and an air outlet 20 connected by a suitable exhaust conduit 22 to a dust collector, not shown. During coating operations, the dust collector continually draws air from the enclosure 12 and collects any dust or particles contained in the exhaust air for subsequent disposal.

The spray system 10 further includes a gas compressor 24 capable of supplying gas pressure up to 3.4 MPa (500 psi) to a high pressure gas ballast tank 26. Many gases can be used in the present invention including air, helium, argon, nitrogen, and other noble gases. The preferred gas is nitrogen. The gas ballast tank 26 is connected through a line 28 to both a high pressure powder feeder 30 and a separate gas heater 32. The gas heater 32 supplies high pressure heated gas, the heated main gas described below, to a kinetic spray nozzle 34. The powder feeder 30 mixes particles of a powder to be sprayed with unheated high pressure gas and supplies the mixture to a supplemental inlet line 48 of the nozzle 34. The powder gas is not heated to prevent powder lines from clogging. A computer control 35 operates to control the pressure of gas supplied to the gas heater 32, the pressure of gas supplied to the powder feeder 30, and the temperature of the heated main gas exiting the gas heater 32.

Figure 2:
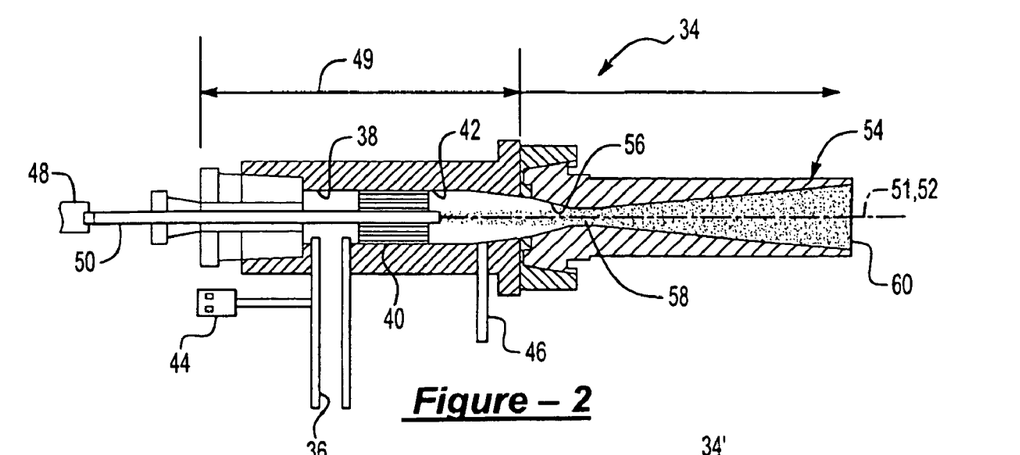
FIG. 2 is an enlarged cross-sectional view of one embodiment of a nozzle system for use in a kinetic spray system according to the present invention.

FIG. 2 is a cross-sectional view of a nozzle 34 for use in the system 10 and its connections to the gas heater 32 and the supplemental inlet line 48. A main gas passage 36 connects the gas heater 32 to the nozzle 34. Passage 36 connects with a premix chamber 38 which directs gas through a flow straightener 40 and into a mixing chamber 42. Temperature and pressure of the gas or other heated main gas are monitored by a gas inlet temperature thermocouple 44 in the passage 36 and a pressure sensor 46 connected to the mixing chamber 42. The premix chamber 38, flow straightener 40, and mixing chamber 42 form a gas/powder exchange chamber 49.

A mixture of high pressure gas and coating powder is fed through the supplemental inlet line 48 to a powder injector tube 50 having a central axis 52 which, in this embodiment, preferentially is the same as a central axis 51 of the gas/powder exchange chamber 49. The length of chamber 49 is preferably from 40 to 80 millimeters and the exit of injector tube 50 is preferably from about 10 to 30 millimeters from the adjacent end of a supersonic nozzle 54. Preferably, the injector tube 50 has an inner diameter of from about 0.3 to 3.0 millimeters. The tube 50 extends through the premix chamber 38 and the flow straightener 40 into the mixing chamber 42.

Mixing chamber 42 is in communication with a de Laval type converging diverging nozzle 54. The nozzle 54 has an entrance cone 56 that decreases in diameter to a throat 58. The entrance cone 56 forms the converging portion of the nozzle 54. Downstream of the throat is an exit end 60. The largest diameter of the entrance cone 56 may range from 10 to 6 millimeters, with 7.5 millimeters being preferred. The entrance cone 56 narrows to the throat 58. The throat 58 may have a diameter of from 1.0 to 6.0 millimeters, with from 2 to 5 millimeters being preferred. The diverging portion of the nozzle 54 from downstream of the throat 58 to the exit end 60 may have a variety of shapes, but in a preferred embodiment it has a rectangular cross-sectional shape. At the exit end 60 the nozzle 54 preferably has a rectangular shape with a long dimension of from 6 to 24 millimeters by a short dimension of from 1 to 6 millimeters. The length of the diverging section can vary from 50 to 1000 millimeters, preferably from 50 to 500 millimeters, and most preferably from 50 to 400 millimeters.

As disclosed in U.S. Pat. Nos. 6,139,913 and 6,283,386 the powder injector tube 50 supplies a particle powder mixture to the system 10 under a pressure in excess of the pressure of the heated main gas from the passage 36. The nozzle 54 produces an exit velocity of the entrained particles of from 200 meters per second to as high as 1300 meters per second. The entrained particles gain primarily kinetic energy during their flow through the nozzle 34. It will be recognized by those of skill in the art that the temperature of the particles in the gas stream will be low and varies depending on the particle size and the main gas temperature. The main gas temperature is defined as the temperature of heated high-pressure gas at the inlet to the nozzle 54. The main gas temperature can be substantially above the melting temperature of the particles being sprayed. In fact, the main gas temperature can vary from about 200 to 1000 degrees Celsius or as high as 7 fold above the melting point of the particles being sprayed depending on the particle material. Despite these high main gas temperatures the particle temperature is at all times lower than the melting point of the particles. This is because the powders are injected into the heated gas stream by the unheated powder gas and the exposure time of the particles to the heated main gas is very short. In other words, the particle energy at the exit of nozzle 34 is predominantly kinetic energy. Therefore, even upon impact there is no change in the solid phase of the original particles due to transfer of kinetic and thermal energy, and no change in their original physical properties. The particles are always at a temperature below their melting point. The particles exiting the nozzle 54 are directed toward a surface of a substrate to coat it.

Upon striking a substrate opposite the nozzle 54 the particles flatten into a nub-like structure with a varying aspect ratio generally depending on the types of sprayed materials. When the substrate is a metal and the particles are a metal the particles striking the substrate surface fracture the surface oxide layer and subsequently form a direct metal-to-metal bond between the metal particle and the metal substrate. Upon impact the kinetic sprayed particles transfer all of their kinetic and thermal energy to the substrate surface and stick onto the substrate. For a given particle to adhere to a substrate it is necessary that it reach or exceed its critical velocity which is defined as the velocity at which it will adhere to a substrate when it strikes the substrate after exiting the nozzle. This critical velocity is dependent on the material composition of the particle and the material composition of the substrate. In general, harder materials must achieve a higher critical velocity before they adhere to a given substrate and harder substrates must be struck at a higher velocity. It is not known at this time exactly what is the nature of the particle to substrate bond; however, it is believed that for the metal particles incident on a metal substrate, a portion of the bond is metallic or metal to metal due to the particles plastically deforming upon striking the substrate and thereby fracturing oxide layers exposing the underlying metal.

Figure 3:
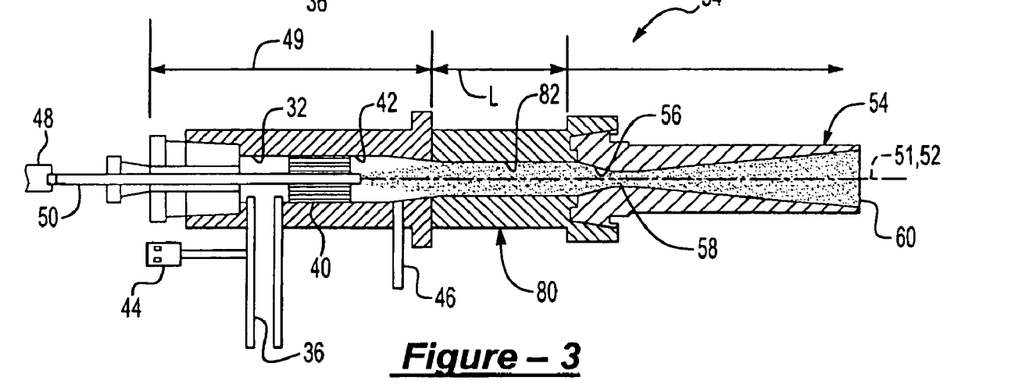
FIG. 3 is an enlarged cross-sectional view of another nozzle system for use in a kinetic spray system according to the present invention.

FIG. 3 is a cross-sectional view of another nozzle system designed in accordance with the present invention. The spray nozzle is generally shown at 34 in FIG. 3. The nozzle 34 is similar to that shown in FIG. 2 with the addition of a powder/gas conditioning chamber 80 positioned between the gas/powder exchange chamber 49 and the supersonic nozzle 54. The powder/gas conditioning chamber 80 has a length L along its longitudinal axis. The axis 52 is the same as axis 51 in this embodiment. Preferably the interior of the powder/gas conditioning chamber 80 has a cylindrical shape 82. Also preferably its interior diameter matches the entrance of the converging portion of the spray nozzle. The powder/gas conditioning chamber 80 releasably engages both the supersonic nozzle 54 and the gas/powder exchange chamber 49. Preferably, the releasable engagement is via correspondingly engaging threads on the gas/powder exchange chamber 49, the nozzle 54, and the powder/gas conditioning chamber 80 (not shown). The releasable engagement could be via other means such as snap fits, bayonet-type connections and others known to those of skill in the art. The length L along the longitudinal axis is preferably at least 20 millimeters or longer. The optimal length of the powder/gas conditioning chamber 80 depends on the particles that are being sprayed and the substrate that is being sprayed with the particles. The optimal length L can be determined experimentally. Preferably the length L ranges from 20 to 1000 millimeters. It has been found that by including a powder/gas conditioning chamber 80 designed in accordance with the present invention one can achieve dramatic increases in deposition efficiency and the ability to use lower main gas temperatures to deposit particles that previously were not able to be deposited. With the insertion of the powder/gas conditioning chamber 80, the distance between the exit of the injector tube 50 and the adjacent end of the nozzle 54 is significantly increased. The increased distance permitted by the conditioning chamber 80 allows for a longer residence time of the particles in the main gas prior to entry into the supersonic nozzle 54. This longer residence time leads to a higher particle temperature, more homogeneous main gas powder intermixing, and a more homogeneous flow of the gas powder mixture. Thus, it is predicted that particles will achieve a higher temperature, closer to but still below their melting point, prior to entry into the supersonic nozzle 54.

The supersonic nozzle 54 described above with respect to FIGS. 2 and 3 and the system of FIG. 1 can be used to physically bond two parts to each other. Preferably the first and second part are each formed from a metal, an alloy, or a combination thereof. In use of the system 10 the parts are place against each other in contact and held there by the work holder 18. Then particles of a powder are directed through the system 10 and the nozzle 54 to strike the parts and form a bonding layer joining the part and having a thickness of from about 0.4 to 10 millimeters, more preferably from 0.4 to 5 millimeters, and most preferably from 0.4 to 1.0 millimeters. The particles can be of a metal, an alloy, or a combination thereof. Preferably, the particles have an average nominal diameter of from 60 to 250 microns, more preferably from 60 to 150 microns, and most preferably from 60 to 100 microns. Preferably the parts being sprayed according to the present invention have a stand-off distance of from 5 to 80 millimeters from the exit end 60 of the nozzle 54, more preferably from 5 to 35 millimeters, and most preferably from about 5 to 30 millimeters. In the present invention either the parts or the nozzle 54 can be moved relative to the other at the desired traverse rate. In the present invention the traverse rate is from 10 to 1000 millimeters per second, preferably from 20 to 250 millimeters per second, more preferably from 50 to 250 millimeters per second, and most preferably from 100 to 250 millimeters per second. The parts are bonded to each other by the particles striking and adhering to each part which builds up the bond layer. The connection is very secure and the process does not dramatically increase the temperature of the parts, thus it finds special use with low melting temperature parts. The nozzle 54 can either be normal to one or more surfaces of the parts or at an angle other than normal during the spraying. It can be beneficial in certain applications to provide a first part that has a planar surface and a second part that has an opening or hole through it. The second part is places over the first part and then they are held by the work holder 18. The particles are directed from the nozzle through the opening to bond the first and second parts to each other at the location of the opening. The sides of the opening can be straight or more preferably sloped to increase the bonding surface area.

As discussed above, in another embodiment, the present invention is directed to a method for formation of a low resistance connection between a pair of conductors, and more particularly to formation of connections between the terminals of multi-cell batteries and their respective bus bars. Thus, preferably the powder particles that find use in the present invention are electrically conductive particles. These can be metals, alloys, or a mixture of metal and alloy particles. Preferably the powder particles are formed from aluminum, copper, gold, silver, tin, zinc, alloys of these metals, or mixtures of any of these. Preferably, the particles have an average nominal diameter of from 60 to 250 microns, more preferably from 60 to 150 microns, and most preferably from 60 to 100 microns. Preferably the substrate being sprayed according to the present invention has a stand-off distance of from 5 to 80 millimeters from the exit end 60 of the nozzle 54, more preferably from 5 to 35 millimeters, and most preferably from about 5 to 30 millimeters. In the present invention either the substrate or the nozzle 54 can be moved relative to the other at the desired traverse rate. In the present invention the traverse rate is from 10 to 1000 millimeters per second, preferably from 20 to 250 millimeters per second, more preferably from 50 to 250 millimeters per second, and most preferably from 100 to 250 millimeters per second.

Figure 4:
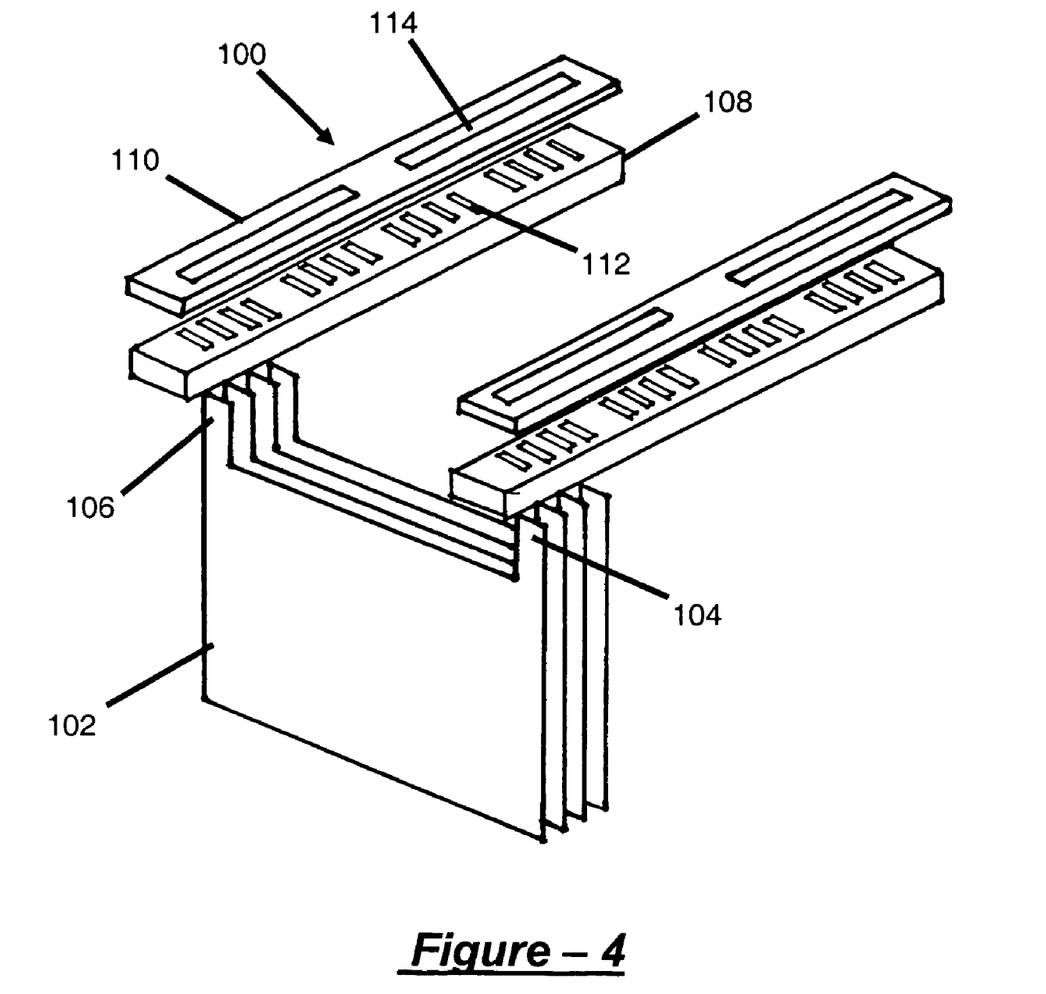
FIG. 4 is a schematic exploded view of a multi-cell battery designed in accordance with the present invention.
Figure 5:
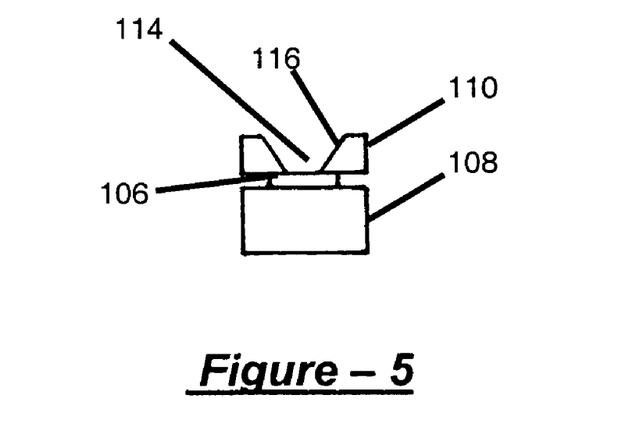
FIG. 5 is a cross-sectional view of a portion of the battery shown in FIG. 4 in an assembled condition.

In FIG. 4 an exploded view of a portion of a multi-cell battery prepared in accordance with the present invention is generally shown at 100. The battery 100 comprises a plurality of cells 102, preferably lithium cells. Each cell 102 has a first 104 and a second terminal 106. These terminals 104, 106 can be formed of the same material, such as for example copper, or they can comprise different materials such as one formed from copper and the other from aluminum. A plastic support 108 having a series of slots 112 cut therein is used to space and organize the cells 102. The terminals 104, 106 are each passed through a slot 112. The cells 102 can be arranged in a parallel or a series electrical fashion. Once passed through a respective slot 112 each terminal 104, 106 is then bent to a 90° angle to lie on the plastic support 108 or on an adjacent folded terminal 104, 106. The plastic support 108 preferably is a high melting plastic material such as nylon 66. The terminals 104, 106 serve as one of the electrical conductors in the electrical connection to be formed. Then a bus bar 110 is placed over each plastic support 108 and clamped in place with releasable clamps (not shown). The bus bar is formed from an electrically conductive material and forms another of the electrical conductors in the electrical connection. Preferable the bus bar 110 is formed from copper. The bus bar further includes at least one slot 114 through it. As can be seen in FIG. 5, when the parts are assembled the terminals 104, 106 are sandwiched between the plastic support 108 and the bus bar 110 with the slot 114 exposing part of the terminal 104, 106. Preferably, the slot 114 has sloped sides 116. Preferably the sides 116 have an angle of less than 90° degrees relative to the terminal 104, 106. Once held in place as shown in FIG. 5 the system 10 is used to apply a kinetic spray to the region of the slot 114 to thereby bond the terminals 104, 106 to the respective bus bar 110. Preferably, the bonding layer has a thickness of from 0.4 to 10 millimeters, more preferably from 0.4 to 5 millimeters, and most preferably from 0.4 to 1 millimeters. During the spraying the longitudinal axis of the nozzle 54 can either be normal to a plane of a surface of the terminal 104, 106 or the bus bar 110 or it can be at an angle of other than normal with respect to these surfaces.

Figure 6:
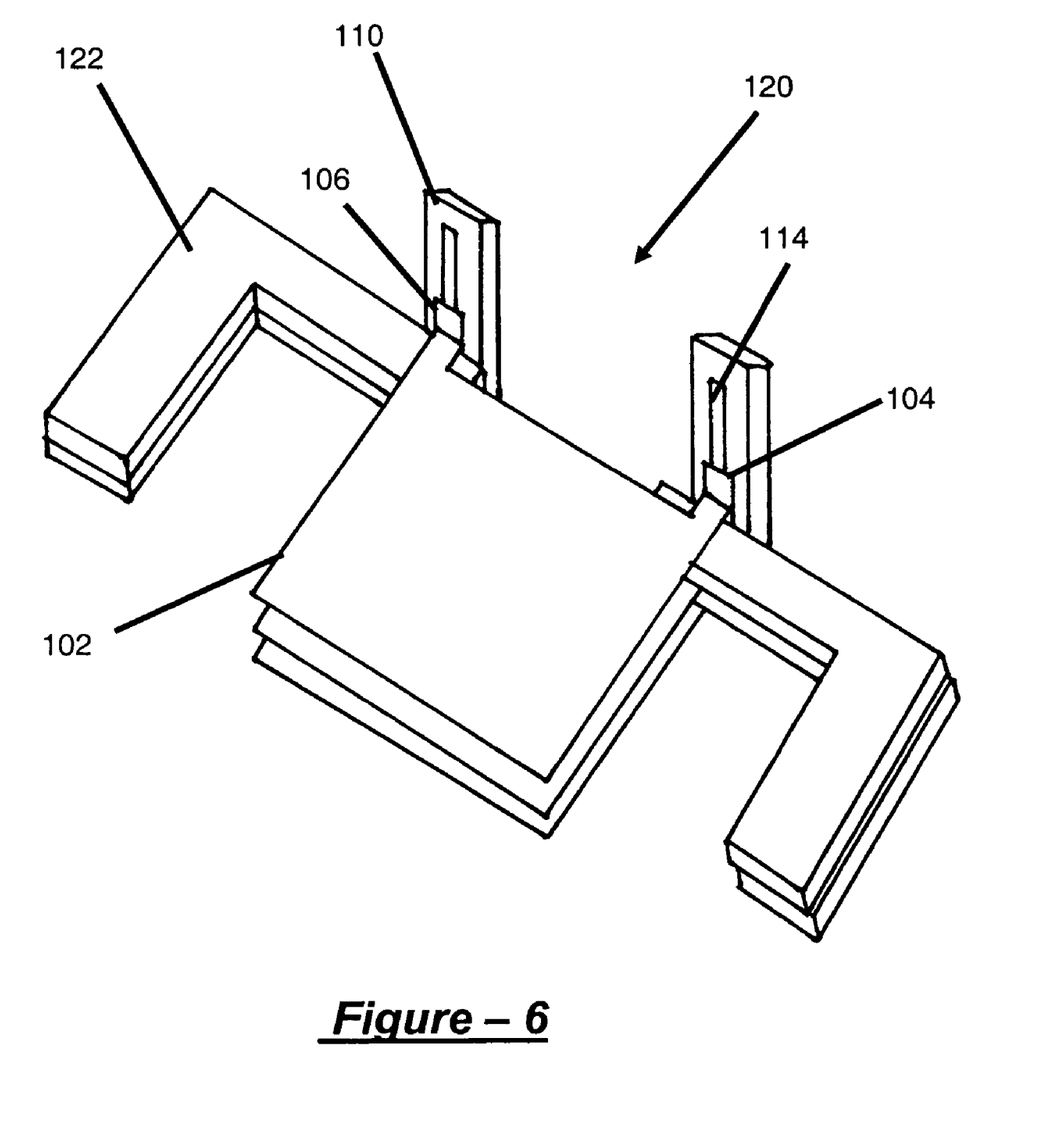
FIG. 6 is a schematic view of another method for preparing a multi-cell battery according to the present invention.

In FIG. 6 an alternative arrangement is show generally at 120. In this arrangement the plastic support 108 is not used to hold the cells 102. Instead a plurality of flexible fingers 122 are inserted, one between each pair of cells 102 to space and hold the cells 102. Then the terminals 104, 106 are bent and held against the respective bus bar 110. The flexible fingers 122 preferably are formed from a metal or alloy such as a steel. In addition, they preferably include an electrically insulative coating. In either arrangement shown in FIGS. 4 and 5 or FIG. 6 it is important to ensure that the kinetic spray process does not raise the temperature of the cells 102 above about 85° C. to prevent damage to the cells 102. The arrangement shown in FIG. 6 has the advantage of allowing the fingers 122 to serve as heat sinks. Preferably the electrical connection formed between the terminal 104, 106 and the bus bar has a resistance of less than or equal to 0.5 milli-Ohms.

Figure 7:
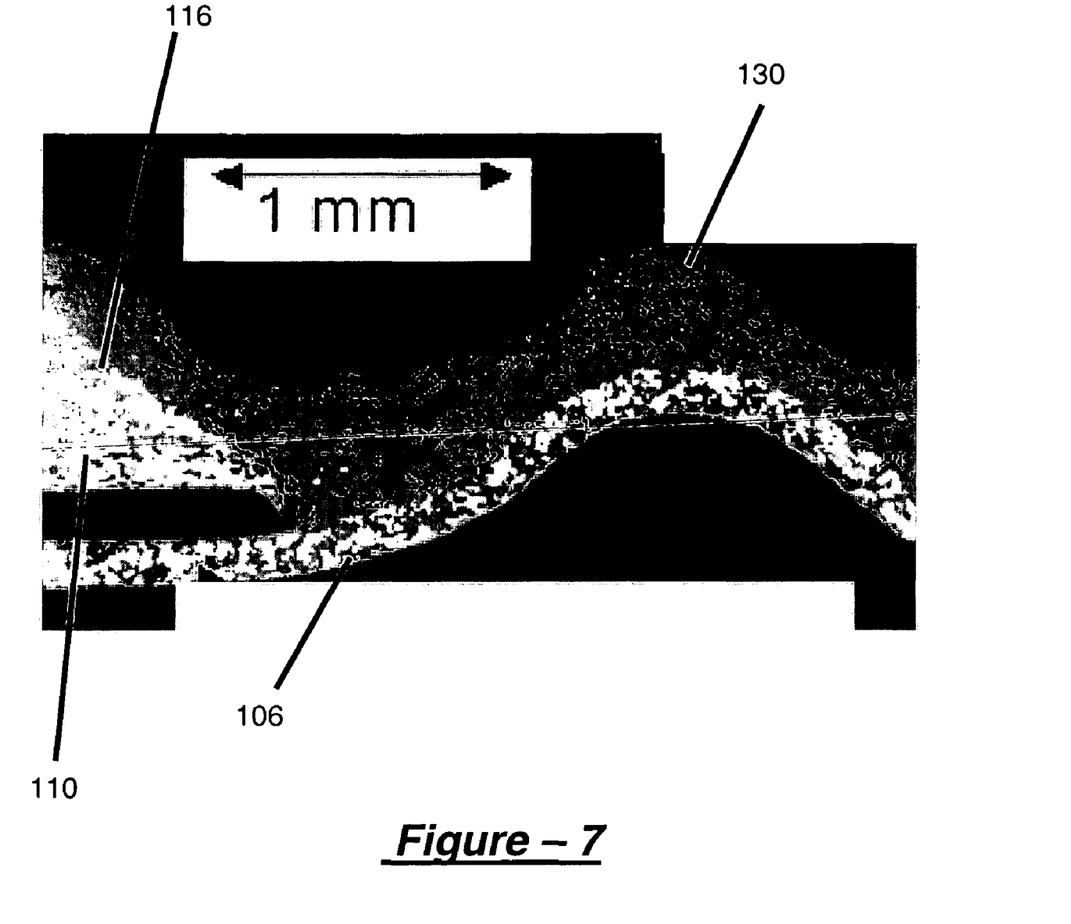
FIG. 7 is a photomicrograph of a cross-section of an electrical connection prepared according to the present invention.

FIG. 7 is a photomicrograph of a cross-section through an electrical connection prepared according to the present invention. One can distinguish the terminal 106 and the bus bar 110 with its sloped side 116. The kinetic spray applied layer is shown at 130. It can be seen that the kinetic layer 130 cleanly joins the two electrical conductors 106 and 110.

What is claimed is:

1. A method of physically bonding two parts to each other comprising the steps of:
   a) providing a first part in contact with a second part, the first part having a top surface and a bottom surface with an opening extending between the top surface and the bottom surface, and the second part having a top surface of the first part in contact with the bottom surface of the first part adjacent the opening, each of the first and the second parts formed from a metal, an alloy, or a mixture of a metal and an alloy;
   b) providing particles of a powder, the particles formed from a metal, an alloy, or a mixture thereof;
   c) entraining the particles in a flow of a heated main gas and heating the particles to a temperature below their melting temperature; and
   d) directing the entrained particles through a converging diverging supersonic nozzle into the opening formed in the first part, accelerating the particles to a velocity sufficient to result in adherence of the particles on the first and the second parts positioned opposite the nozzle, thereby physically bonding the first and the second parts to each other.

2. The method of claim 1, wherein step b) comprises providing particles having an average nominal diameter of from 60 to 250 microns, 3. The method of claim 1 wherein step b) comprises providing particles having an average nominal diameter of from 60 to 150 microns.

4. The method of claim 1 wherein step b) comprises providing particles having an average nominal diameter of from 60 to 100 microns.

5. The method of claim 1 wherein step c) comprises entraining the particles in a heated main gas having a temperature of up to seven fold above a melting temperature of the particles.

6. The method of claim 1 wherein step c) comprises entraining the particles in a heated main gas having a temperature of from 200 to 1000° C.

7. The method of claim 1, further comprising in step c) entraining the particles in a flow of a heated main gas in a gas/powder exchange chamber; directing the particles entrained in the main gas in the gas/powder exchange chamber into a powder/gas conditioning chamber having a length along a longitudinal axis of equal to or greater than 20 millimeters; and directing the particles entrained in the flow of gas from the conditioning chamber into the converging diverging supersonic nozzle.

8. The method of claim 7, comprising providing a powder/gas conditioning chamber having a length along the longitudinal axis of from 20 to 1000 millimeters.

9. The method of claim 7, comprising providing a powder/gas conditioning chamber having a length along the longitudinal axis of from 20 to 500 millimeters.

10. The method of claim 7, comprising providing a powder/gas conditioning chamber having a length along the longitudinal axis of from 50 to 200 millimeters.

11. The method of claim 1, wherein step d) comprises directing the entrained particles through a converging diverging supersonic nozzle having a throat with a diameter of from 1 to 6 millimeters.

12. The method of claim 1, wherein step d) comprises directing the entrained particles through a converging diverging supersonic nozzle having a throat with a diameter of from 2 to 5 millimeters.

13. The method of claim 1, wherein step d) comprises directing the entrained particles through a converging diverging supersonic nozzle having a length in a diverging section of from 50 m to 1000 millimeters.

14. The method of claim 1, wherein step d) comprises directing the entrained particles through a converging diverging supersonic nozzle having a length in a diverging section of from 50 to 500 millimeters.

15. The method of claim 1, wherein step d) comprises positioning the first and second parts at a stand off distance of from 5 to 80 millimeters from the nozzle.

16. The method of claim 1, wherein step d) comprises positioning the first and second parts at a stand off distance of from 5 to 35 millimeters from the nozzle.

17. The method of claim 1, wherein step d) comprises positioning the first and second parts at a stand off distance of from 5 to 30 millimeters from the nozzle.

18. The method of claim 1, wherein step d) comprises passing one of the first and second parts or the nozzle past the other of the first and second parts or the nozzle at a traverse speed of from 10 to 1000 millimeters per second.

19. The method of claim 1, wherein step d) comprises passing one of the first and second parts or the nozzle past the other of the first and second parts or the nozzle at a traverse speed of from 20 to 250 millimeters per second.

20. The method of claim 1, wherein step d) comprises passing one of the first and second parts or the nozzle past the other of the first and second parts or the nozzle at a traverse speed of from 50 to 250 millimeters per second.

21. The method of claim 1, wherein step d) comprises bonding the first and second parts to each other with a kinetic spray applied layer having a thickness of from 0.4 to 10 millimeters.

22. The method of claim 1, wherein step d) comprises bonding the first and second parts to each other with a kinetic spray applied layer having a thickness of from 0.4 to 5 millimeters.

23. The method of claim 1, wherein step d) comprises bonding the first and second parts to each other with a kinetic spray applied layer having a thickness of from 0.4 to 1 millimeters.

24. The method of claim 1, wherein step d) comprises positioning the nozzle such that a central longitudinal axis of the nozzle is normal relative to a plane of a surface of at least one of the first or the second parts.

25. The method of claim 1, wherein step d) comprises positioning the nozzle such that a central longitudinal axis of the nozzle is at an angle other than 90 degrees relative to a plane of a surface of at least one of the first or the second parts.

26. The method of claim 1, further comprising providing a first and a second part wherein at least one of the first or the second part has an opening therein and wherein the particles are directed at the opening thereby bonding the first and the second part to each other at the opening.

27. The method of claim 1, wherein step a) comprises providing a first part formed from a first material and a second part formed from a second material wherein the first and the second materials are different from each other.

28. The method of claim 1, wherein step a) comprises providing a first part and a second part formed from the same material.

29. A method of physically bonding two parts to each other, the method comprising the steps of:
 a) positioning a first part in contact with a second part, the first part having a top surface and a bottom surface with an opening extending between the top surface and the bottom surface, and the second part having a top surface in contact with the bottom surface of the first part adjacent the opening, the first part and the second part each formed from a metal, an alloy, or a metal-alloy mixture;
 b) combining particles of a powder, the particles formed from a metal, an alloy, or a metal-alloy mixture, with a first pressurized gas;
 c) combining the particles in the first pressurized gas with a second pressurized gas, whereby the second pressurized gas is heated;
 d) heating the particles to a temperature below their melting temperature using the second pressurized gas; and
 e) directing the heated particles through a converging diverging supersonic nozzle into the opening formed in the first part, accelerating the particles to a velocity sufficient to result in adherence of the particles on the first part and the second part positioned opposite the nozzle, thereby physically bonding the first part to the second part.

30. The method of claim 29, wherein step b) comprises combining particles of a powder having an average nominal diameter of from 60 to 250 microns with the first pressurized gas.

31. The method of claim 29 wherein step d) comprises heating the particles using the second pressurized gas having a temperature of up to seven fold above a melting temperature of the particles.

32. The method of claim 29 wherein step d) comprises heating the particles using the second pressurized gas having a temperature of about 200° C. to about 1000° C.

33. The method of claim 29 wherein step d) comprises heating the particles using the second pressurized gas having a temperature no greater than about 1000° C.

34. The method of claim 29, wherein step c) is performed within a mixing chamber of a converging diverging supersonic nozzle.

35. The method of claim 29, wherein step e) is performed by directing the heated particles using solely the first pressurized gas and the second pressurized gas.

36. The method of claim 29, wherein step a) is performed by positioning a first part in contact with a second part so that no gap exists where the first part contacts the second part.

37. A method of physically bonding two parts to each other, the method comprising the steps of:
 a) positioning a first part in contact with a second part, the first part having a top surface and a bottom surface with an opening extending between the top surface and the bottom surface, and the second part having a top surface in contact with the bottom surface of the first part adjacent the opening, the first part and the second part each formed from a metal, an alloy, or a metal-alloy mixture;
 b) combining particles of a powder, the particles formed from a metal, an alloy, or a metal-alloy mixture, with a first pressurized gas;
 c) introducing the particles and the first pressurized gas into a mixing chamber of a converging diverging supersonic nozzle;
 d) combining the particles in the first pressurized gas in the mixing chamber of the nozzle with a second pressurized gas, whereby the second pressurized gas is heated;
 e) heating the particles to a temperature below their melting temperature using the second pressurized gas in the mixing chamber; and
 f) directing the heated particles out of the nozzle into the opening formed in the first part, accelerating the particles to a velocity sufficient to result in adherence of the particles on the first part and the second part positioned opposite the nozzle, thereby physically bonding the first part to the second part.

38. The method of claim 37, wherein step b) comprises combining particles of a powder having an average nominal diameter of from 60 to 250 microns with the first pressurized gas.

39. The method of claim 37 wherein step e) comprises heating the particles using the second pressurized gas having a temperature of up to seven fold above a melting temperature of the particles.

40. The method of claim 37 wherein step e) comprises heating the particles using the second pressurized gas having a temperature of about 200° C. to about 1000° C.

41. The method of claim 37 wherein step d) comprises heating the particles using the second pressurized gas having a temperature no greater than about 1000° C.

42. The method of claim 37, wherein step f) is performed by directing the heated particles using solely the first pressurized gas and the second pressurized gas.

43. The method of claim 37, wherein step a) is performed by positioning a first part in contact with a second part so that no gap exists where the first part contacts the second part.

* * * * *